G. MOORE.

STREET RAILWAY CAR.

No. 11,396. Reissued Dec. 26, 1893.

WITNESSES.

Alice H. Morrison

Arthur F. Randall,

INVENTOR.

George Moore by Macleod Calver & Randall his Attorneys,

THE NORRIS PETERS CO., WASHINGTON, D. C.

3 Sheets—Sheet 2.

G. MOORE.

STREET RAILWAY CAR.

No. 11,396. Reissued Dec. 26, 1893.

WITNESSES.

A. C. Harmon.

Arthur F. Randall,

INVENTOR.

George Moore by Macleod Calver & Randall:

his attorneys.

THE NORRIS PETERS CO., WASHINGTON, D. C.

3 Sheets—Sheet 3.

G. MOORE.

STREET RAILWAY CAR.

No. 11,396. Reissued Dec. 26, 1893.

WITNESSES.

Alice H. Morrison

Arthur F. Randall.

INVENTOR.

George Moore by Macleod Calver & Randall his Attorneys.

THE NORRIS PETERS CO., WASHINGTON, D. C.

UNITED STATES PATENT OFFICE.

GEORGE MOORE, OF BOSTON, MASSACHUSETTS, ASSIGNOR OF ONE-HALF TO G. WALDON SMITH, OF SAME PLACE.

STREET-RAILWAY CAR.

SPECIFICATION forming part of Reissued Letters Patent No. 11,396, dated December 26, 1893.

Original No. 498,071, dated May 23, 1893. Application for reissue filed September 15, 1893. Serial No. 485,625.

*To all whom it may concern:*

Be it known that I, GEORGE MOORE, a citizen of the United States, residing at Boston, in the county of Suffolk and State of Massachusetts, have invented certain Improvements in Street-Railway Cars, of which the following is a full, clear, and exact description, reference being had to the accompanying drawings, making part of this specification, in which—

Figure 1:
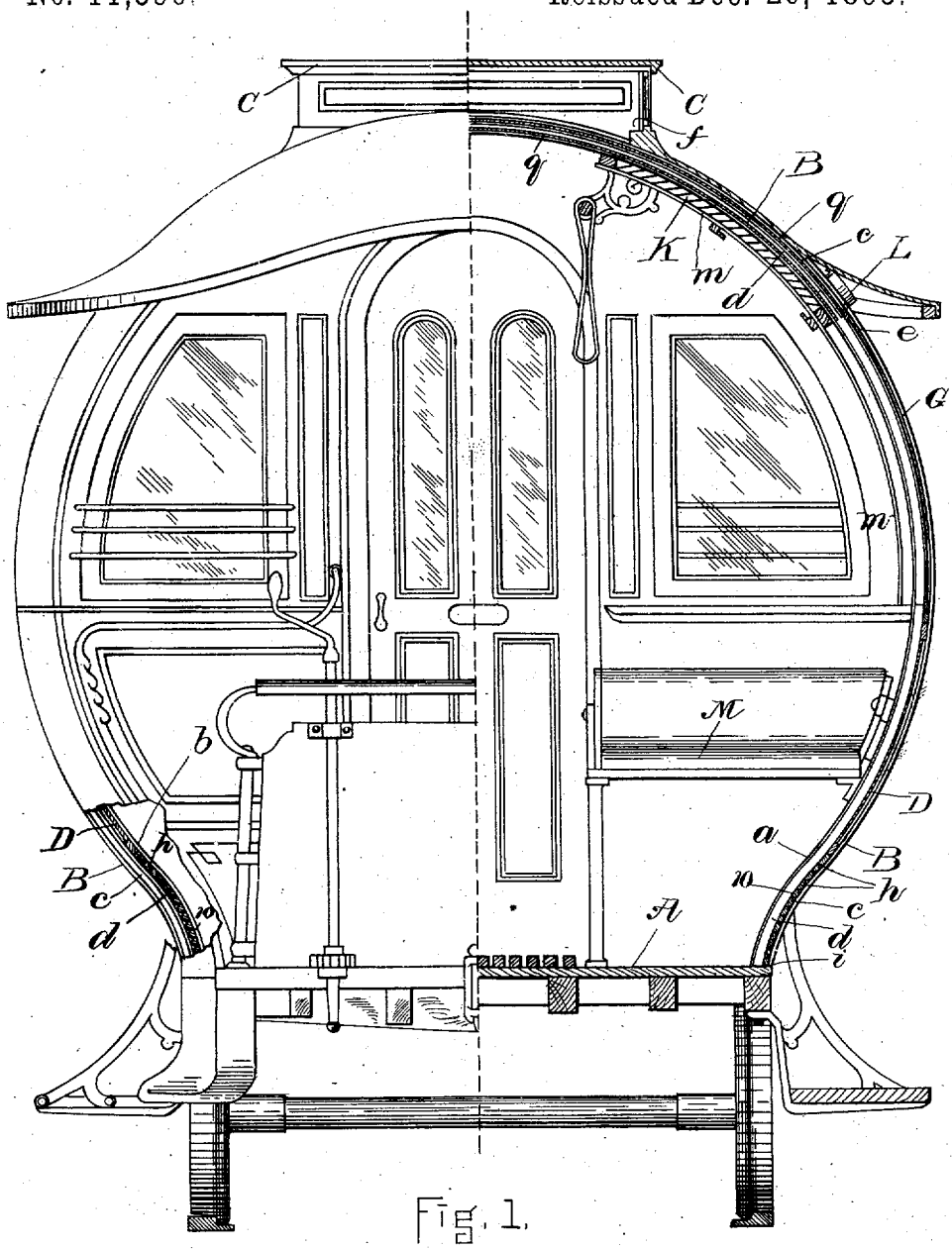
Figure 2:
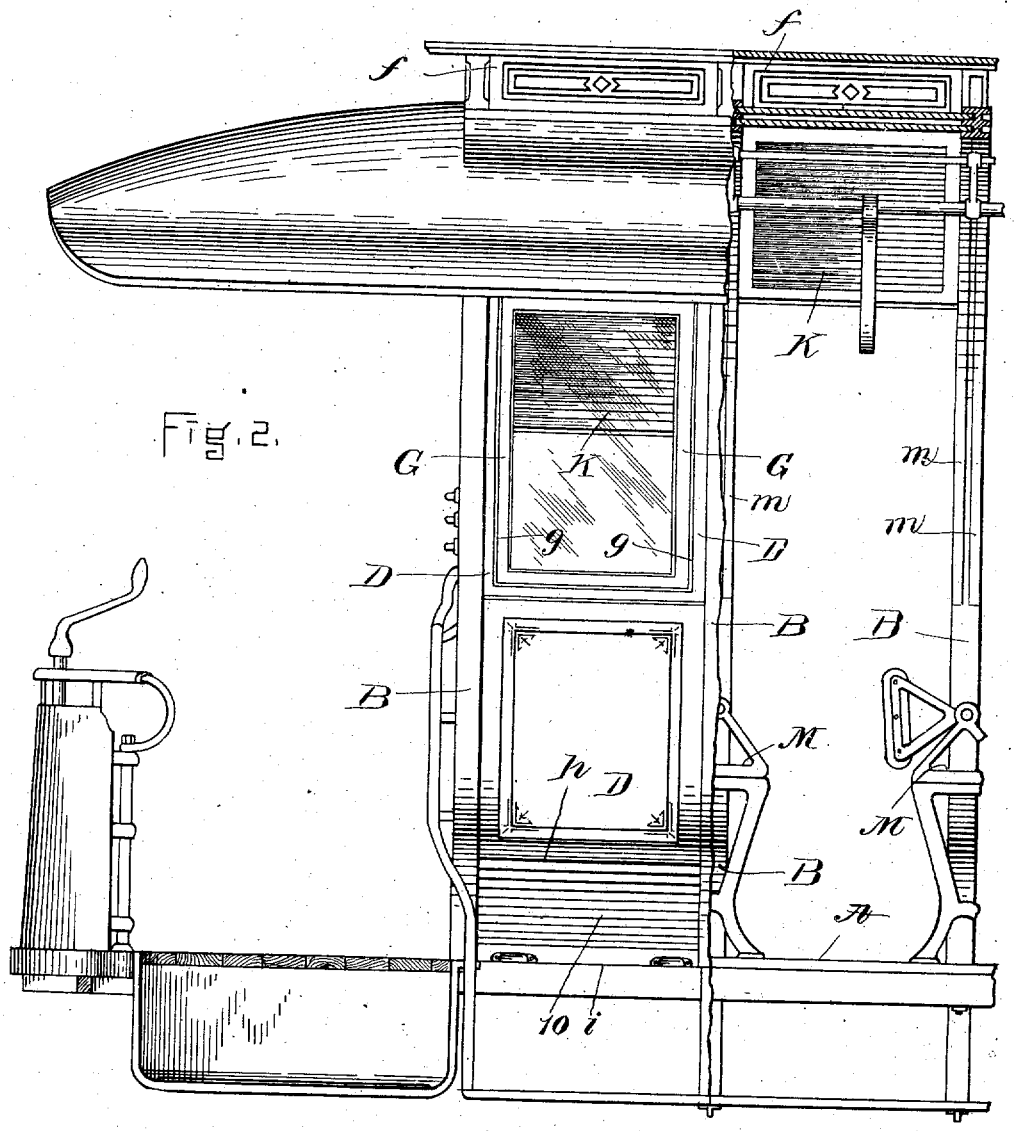
Figure 3:
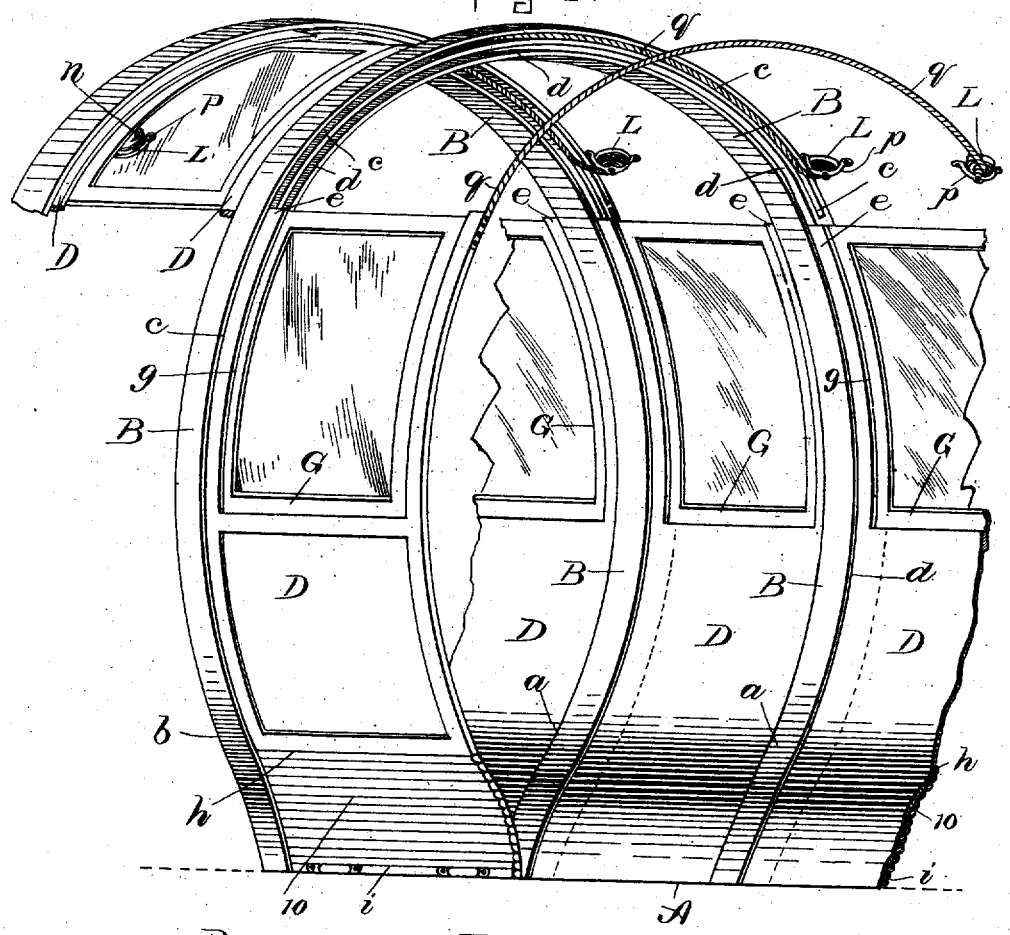
Figure 4:
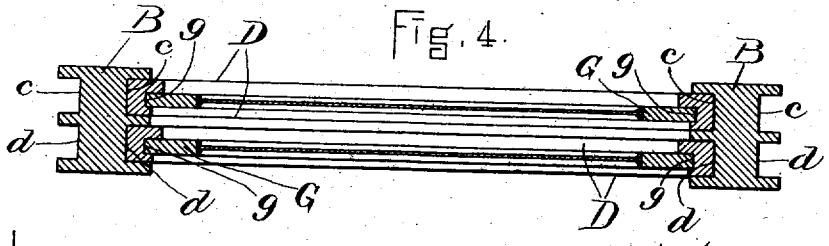

Figure 1 is an end view of a street-railway car constructed in accordance with my invention, the right-hand half being shown in vertical transverse section and a portion of the left-hand half being broken away to show the interior construction. Fig. 2 is a sectional elevation of one end of the car showing one of the movable side sections drawn down and the adjacent side section raised to the position which it occupies when the car is an open one. Fig. 3 is a perspective view of a portion of the car body, illustrating the construction of the curved upright frames, and the rigid movable side sections which carry the window sashes, and are arranged between said upright frames to slide in grooves or ways therein. Fig. 4 is a vertical section through a portion of the top of the car showing two of the upright frames and the two opposite movable side-sections between the same when said side sections are thrown upward into a position to overlap each other, as when the car is converted from a closed to an open one.

My invention relates to that class of cars known as "convertible cars" which can be readily changed from a closed to an open condition and vice versa, and my invention has for its object to simplify the construction of cars of this description and facilitate the operation of converting the same from closed to open ones and vice versa.

To this end my invention consists in the combination with a car having the sides and top of its body of circular form in cross section, of rigid or non-flexible movable side sections containing the window sashes and having the same curvature as the body of the car, said movable side sections being adapted to slide up and down between the upright frames of the car body in suitable grooves or ways arranged concentrically one outside the other in such manner as to permit two opposite movable side sections forming a pair to overlap or slide past each other in the roof or upper portion of the car as hereinafter set forth.

In the said drawings A represents the floor of the car from which rise the upright frames B which support the roof C and are of circular form, as shown, each frame B from the point *a* to the point *b* forming the arc of a true circle as shown in Figs. 1 and 3. These frames B are provided with two concentric grooves *c d* on each side extending entirely around the arc of the circle and adapted to receive the rigid movable side-sections D which are curved in the arc of a circle coinciding with that of the frames B to enable them to move freely up and down within said grooves, the sections D on one side of the car fitting within the grooves *c*, and the sections D on the opposite side fitting within the grooves *d* by which construction it will be seen that when the side sections upon opposite sides of the car are raised, as is necessary to convert the car from a closed to an open one each two opposite side sections forming a pair will overlap or slide past each other in the roof or upper portion of the car as shown in Fig. 4, without any interference whatever. When the car is to be converted from an open to a closed one, the side sections D are drawn down into the positions seen in Fig. 1, and at the left-hand side of Fig. 2 when their upper ends *e* will be clear of the roof, affording free ventilation through the usual windows or apertures *f* therein as would be necessary in a closed car. Each of the non-flexible curved sections D is provided with suitable curved grooves or ways *g* Figs. 3 and 4 for the reception of the curved window sashes G which slide freely up and down therein and are carried with the side sections when the latter are moved up and down within their respective grooves *c d*. The windows can thus be raised and lowered in the usual manner in the movable side sections with perfect ease when the car is a closed one and it will be obvious that in converting the car from a closed to an open one, no previous letting down of the window sashes into special grooves for their reception or swinging up a portion of the side of the car on hinges is required and consequently the construction is materially simplified and the operation of converting the car from an open to a closed one, or vice versa greatly facilitated, while the necessity of making the side sections flexible throughout is avoided, which is a great advantage as they can, when rigid, be made stronger, cheaper, and more durable.

The lower portion 10 of each side section from *h* to *i* is composed of slats covered on the inside by and secured to a strong fabric or flexible sheet material whereby it is permitted to conform to the curvature of the extension of the groove *c* or *d* in which it fits when the said sections are in the positions shown in Fig. 1.

K represents the blinds which are fitted to slide up and down in suitable guides or ways *m* secured to the inner sides of the upright frames B, said blinds having no connection with the side sections D and not being movable therewith.

L are spring cases or drums containing coiled springs *n* Fig. 3 and supported in suitable brackets *p* secured to the frame of the car, said drums being connected to the tops of the side sections D by wire cords *q* to assist in raising said sections when the car is to be converted from a closed to an open one.

M are the seats which are preferably arranged on either side of a central aisle but the seats and their arrangements within the car form no part of my invention and may be varied to suit the requirements of the case.

What I claim is—

1. In a railway car, the combination with the upright frames of circular form from near the floor on one side of the car to a corresponding point on the opposite side of the car, of movable side sections on the opposite sides of the car arranged to slide upon said upright frames and to partly pass each other and overlap when in their raised position under the roof of the car, substantially as described.

2. In a railway car, the combination with the upright frames of circular form from near the floor on one side of the car to a corresponding point on the other side thereof, of the rigid and inflexible side sections fitted at their edges to the said upright frames, having the same curvature as the said upright frames, and arranged to slide up and down between the latter, substantially as set forth.

3. In a street railway car, the combination with the circular upright frames provided with two concentric grooves of the movable side sections having the same curvature as the upright frames, said movable side sections being arranged to slide up and down between said upright frames in the concentric grooves therein in such manner that two opposite side sections, forming a pair, will, when raised, overlap or slide past each other in the roof or upper portion of the car, substantially as set forth.

4. In a street railway car, the combination with the circular upright frames provided on each side with two concentric grooves, of the movable side sections containing the window sashes and having the same curvature as the upright frames, said movable side sections being arranged to slide up and down between said upright frames in the concentric grooves therein in such manner that two opposite side sections, forming a pair, will when raised, overlap or slide past each other in the roof or upper portion of the car, substantially as set forth.

5. In a street-railway car, the combination of the upright frames B forming the sides and top of the car body, said frames being curved in the arc of a circle, and being provided with concentric grooves *c d*, the movable side sections D having a curvature corresponding to or concentric with said upright frames and arranged to slide between the same in the said concentric grooves, and the two opposite side sections which form a pair being adapted when raised to overlap or slide past each other in the roof or upper portion of the car, the window sashes G sliding within and carried by said side sections and the flexible portions 10 connected with and forming the bottoms of the movable side sections, D, all constructed to operate substantially as described.

6. In a street railway car the combination of the upright frames B forming the sides and top of the car-body, said frames being curved in the arc of a circle and being provided with concentric grooves *c d* the movable side sections D having a curvature corresponding to or concentric with said upright frames and arranged to slide between the same in the said concentric grooves, and the two opposite side sections which form a pair being adapted when raised to overlap or slide past each other in the roof or upper portion of the car, the window sashes G sliding within and carried by said side sections, the flexible portions 10 connected with and forming the bottoms of the movable side sections D, and the springs *n* and drums L, the latter connected with the movable side sections, by cords or wires substantially as and for the purpose set forth.

GEORGE MOORE.

Witnesses:
WM. A. MACLEOD,
G. WALDON SMITH.